United States Patent [19]

Stickler et al.

[11] Patent Number: 5,088,960
[45] Date of Patent: Feb. 18, 1992

[54] AIR BLAST FOR CLEANING AXIAL SEPARATOR

[75] Inventors: Mark F. Stickler, Silvis; Michael D. Benhart, Moline, both of Ill.

[73] Assignee: Deere & Company, Moline, Ill.

[21] Appl. No.: 669,787

[22] Filed: Mar. 15, 1991

[51] Int. Cl.$^5$ .................. A01F 7/06; A01F 12/54; A01F 12/00
[52] U.S. Cl. ........................ 460/80; 460/99; 460/100; 460/103
[58] Field of Search ............ 460/103, 80, 69, 99, 460/100, 117, 119

[56] References Cited

U.S. PATENT DOCUMENTS

| | | | |
|---|---|---|---|
| 1,848,252 | 3/1932 | Hermann | 460/117 |
| 1,854,954 | 4/1932 | Pulz | 460/117 |
| 4,711,253 | 12/1987 | Anderson | 460/100 |
| 4,739,773 | 4/1988 | West et al. | 460/80 X |
| 4,884,994 | 12/1989 | Hall et al. | 460/80 |
| 4,906,262 | 3/1990 | Nelson et al. | 55/290 |

Primary Examiner—Stephen J. Novosad

[57] ABSTRACT

An agricultural combine having a pair of side-by-side axial separators. Each of the axial separators comprises a cylindrical tube, a rotor housed in the tube, an inlet and an outlet. An axial air stream is directed along the top of the axial separator to remove dust, chaff and other debris that may accumulate there. The air stream is intercepted from the cooling fan of an internal combustion engine by duct work that directs the air stream to a deflector located above the axial separators. The deflector forms a forward axial air stream component and a rearward axial air stream component. Exhaust openings are formed in the sidewalls of the combine to vent the forward air stream component. An exhaust gap is formed at the rear of the axial separator to vent the rearward air stream component.

12 Claims, 3 Drawing Sheets

AIR BLAST FOR CLEANING AXIAL SEPARATOR

BACKGROUND OF THE INVENTION

1. Field of the Invention

The invention is directed to using engine cooling air to pneumatically blast dust, chaff and other debris off the top of an axial separator.

2. Description of the Prior Art

In threshing a harvested crop, the grain is separated from straw and chaff and deposited into a holding tank. With conventional combines the harvested crop is directed to a transversely mounted threshing cylinder and concave, which threshes the crop separating the grain from straw. The residue is then directed to a beater further separating the grain from straw. The straw residue is then passed over oscillating apertured straw walkers which direct the straw out of the back of the combine while allowing additional grain to fall through the apertures. Grain and chaff falling from the threshing concave and straw walkers is directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. Case International of Raoine, Wis. currently markets and manufactures a axial flow combine having a single rotor. Ford New Holland of New Holland, Pa. currently markets and manufactures an axial flow combine having a pair of rotors mounted side-by-side.

A hybrid machine having a transverse threshing cylinder and a pair axial separating units is disclosed in U.S. Pat. No. 4,739,773. The axial separating units comprise cylindrical tubes having rotors housed therein. It has been found that dust, chaff and other debris collects on the top of the axial separating units.

SUMMARY

The present invention is directed to using engine cooling air to pneumatically blast dust, chaff and other debris off the top of the axial separator units. Duct work directs cooling air from the engine cooling system to the top of the axial separator. A deflector located above the separator divides the air into a forward component and a rearward component. Exhaust openings in the side walls of the combine provide passages through which the dust and chaff are expelled by the forward air stream component. A transverse exhaust gap is provided for exhausting the rearward air stream component.

DETAILED DESCRIPTION

Figure 1:
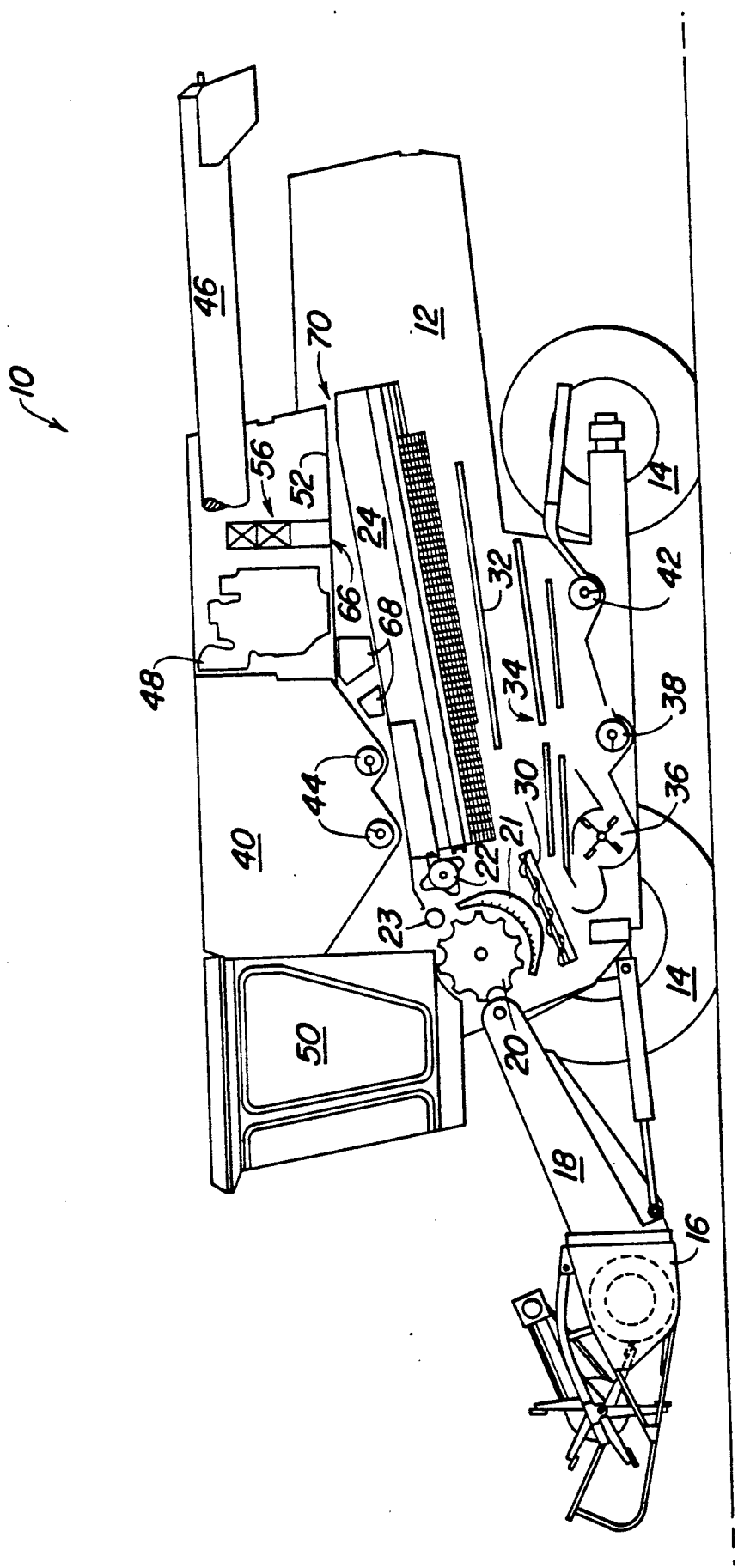
FIG. 1 is a semi-schematic side view of a combine having a transverse threshing cylinder and an axial separator.

FIG. 1 illustrates a self-propelled combine 10 having a supporting structure 12. The supporting structure is supported and propelled by ground engaging means comprising wheels 14. The ground engaging wheels are driven by a propulsion means (not shown), for propelling the combine across a field. The forward part of the combine is provided with a harvesting platform 16 for harvesting a crop in a field and directing the harvested crop upwardly through a feederhouse 18 to the threshing and separating means. The threshing and separating means comprises a transverse threshing cylinder 20 and associated concave 21 to which the harvested crop is initially directed. The threshed crop is then directed to a stripping roller 23 and beater 22 from which it enters axial separator means 24.

A similar axial separator is disclosed in U.S. Pat. No. 4,884,994 which is incorporated herein by reference. Such an axial separator comprises a pair of side-by-side cylindrical tubes. Each tube is provided with a rotor having fixed fingers or tines. Threshed crop material from the beater 22 is top fed into the tubes where it engages the rotors. The top inside surface of each tube is provided with vanes for driving the crop material rearwardly as the rotor tines throw the crop material upwardly to engage the vanes. The bottom of each tube is provided with grates through which grain and chaff fall onto shaker pan 32. Residue straw is discharged from the rear of the tubes.

Grain and chaff falling from the threshing and separating means falls onto auger 30 and shaker pan 32 which direct the grain and chaff to cleaning shoe 34. The cleaning shoe is provided with a blower assembly 36 to assist in separating the grain from the chaff. Clean grain is driven by the clean grain cross auger 38 to an elevator (not shown) which directs the grain to grain tank 40. Tailings cross auger 42 directs unthreshed heads back to the threshing means through another elevator (not shown). Clean grain is unloaded from grain tank 40 through an unloading system comprising cross augers 44 and unloading auger 46.

All the various systems are driven by internal combustion engine 48 which is controlled by the operator from operator's cab 50. The threshing means, separating means and cleaning means are housed within the sidewalls of the supporting structure.

Figure 2:
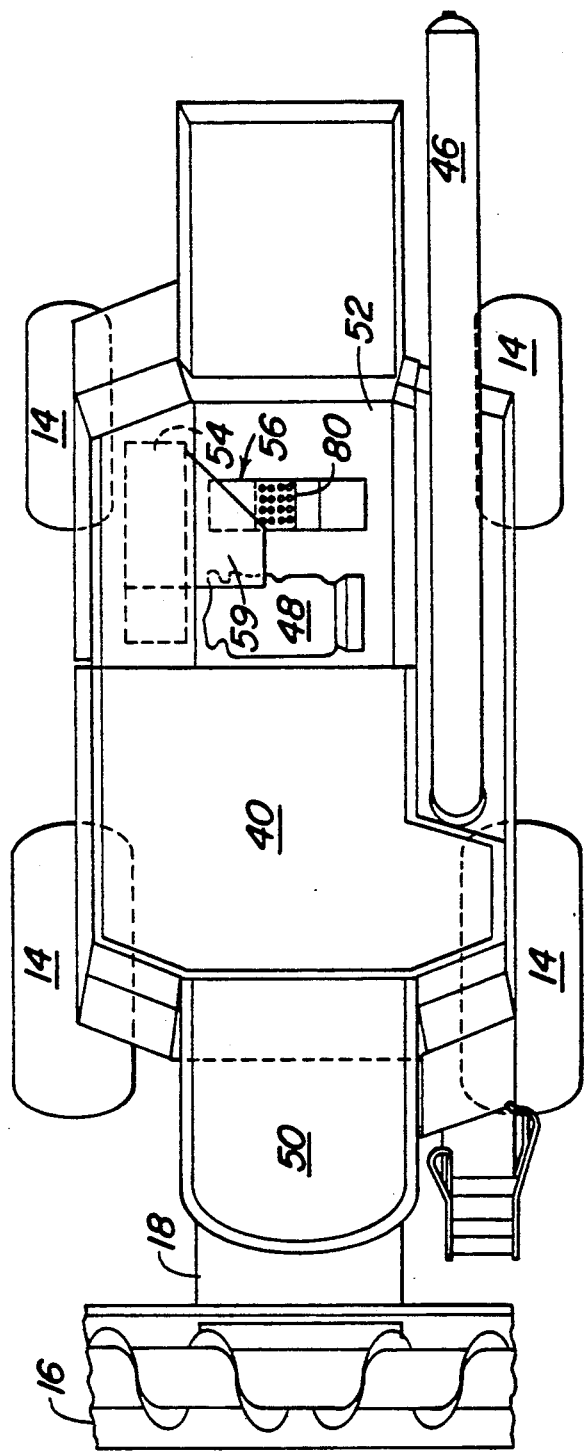
FIG. 2 is a top view of the combine.

As illustrated in FIG. 2, engine 48 is located on a work platform 52 located to the rear of grain tank 40. The work platform 52 is used to service the engine. The engine cooling system comprising a cooling fan, a radiator and a self cleaning rotary screen are located at 54. The cooling system is best disclosed in U.S. Pat. No. 4,906,262, which is incorporated herein by reference.

Figure 4:
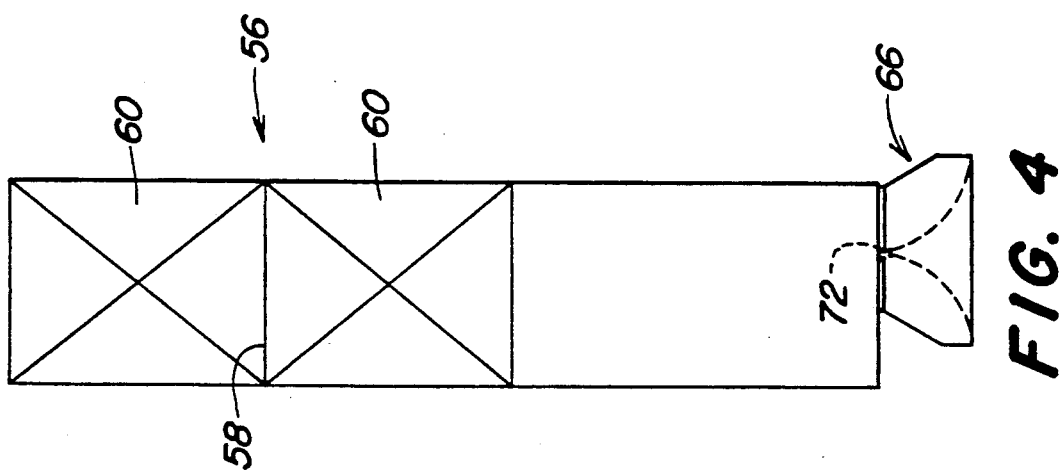
FIG. 4 is a partial cross sectional view of the duct work and deflector taken along line 4——4.
Figure 3:
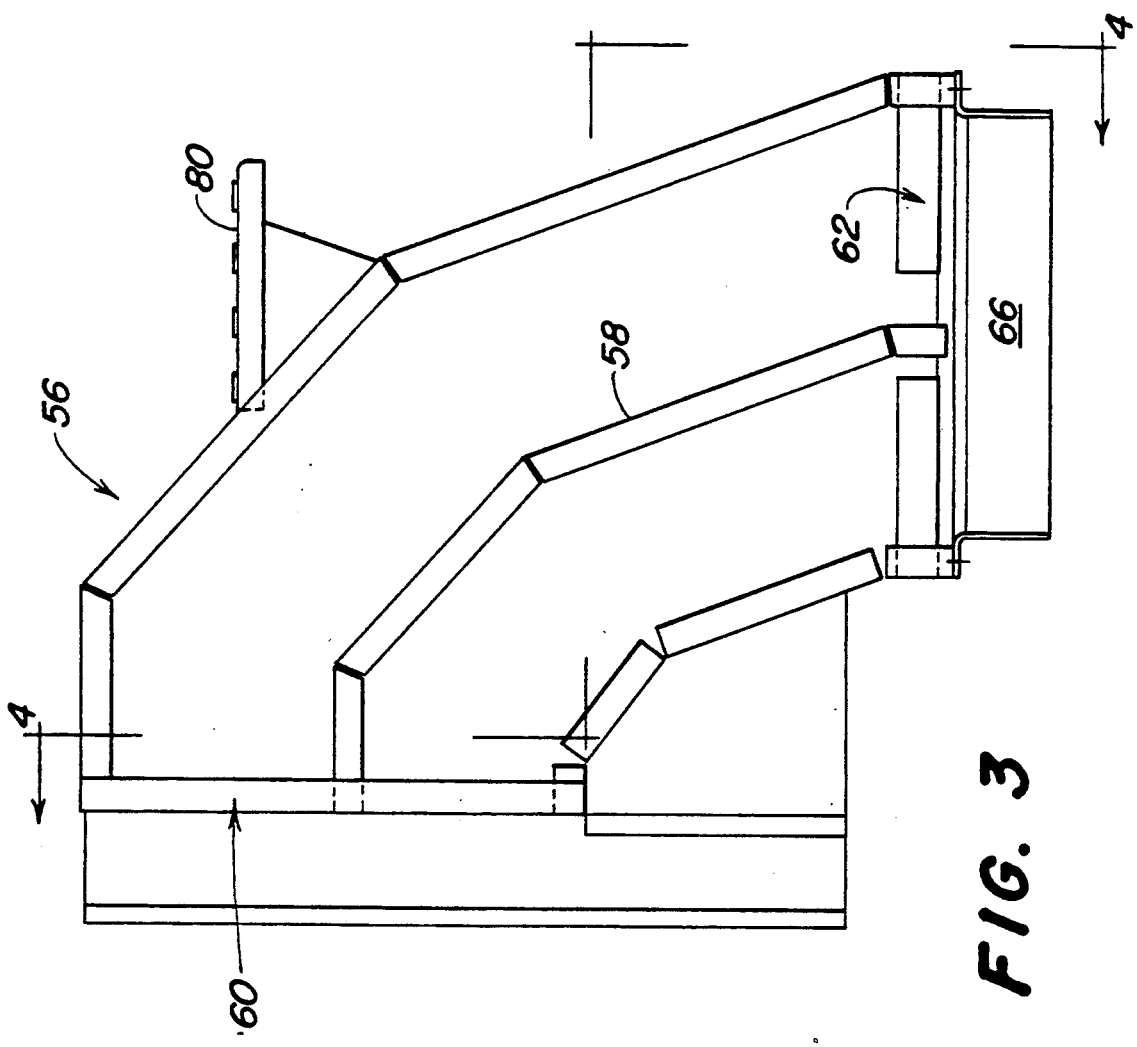
FIG. 3 is a front view of the duct work and air deflector.

Duct work 56 for intercepting a portion of the cooling air stream is located behind the engine and pneumatically downstream of the engine cooling fan. The duct work is best illustrated in FIGS. 3 and 4 and is provided with an internal guide vane 58 providing an even flow of air within the duct work. As cooling air is drawn by the cooling fan through the radiator and rotary screen it forms a transverse horizontal air stream. Most of this horizontal air stream is directed to the engine 48 by shroud 59, however a portion of this air stream is intercepted by inlet 60 of the duct work 56. The structure of the duct work 56 and the internal guide vane 58 change the direction of the air stream so that it flows vertically downward towards the axial separators.

The air is expelled from the duct work through duct work outlet 62 which is aligned with an opening located in the work platform 54. As the now vertically downward air stream is directed through outlet 62 it encounters deflector 66. Air deflector 66 divides the air stream into two components, a forward component and a rearward component. The air deflector changes the direction of the air stream from a vertically downward air stream into a substantially horizontal axial air stream having forward and rearward components.

The forward and rearward components of the horizontal axial air stream prevents dust and other debris from accumulating on top of the axial separators. Forward exhaust openings 68 are formed in the side walls of the supporting structure. These openings vent the forward space located between the deflector and the openings 68. Dust and chaff is expelled from the combine through these apertures.

An exhaust gap 70 is formed between the bottom of the work platform 54 and rear top portion of the axial separator units. This gap is used for venting the rearward space between the deflector and the rear portion of the axial separator units.

The vertex 72 of the deflector is transversely aligned along the rear third of the air outlet 62. This is designed to force more air forward as the exhaust openings 68 are pneumatically more inefficient than exhaust gap 70 as the airflow must make a perpendicular turn to escape through the sidewalls. Less air flow is needed to the rear, as the transverse gap 70 is better aligned with the air flow across the top of the separator.

A step 80 is mounted to the duct work 56 to facilitate servicing of the engine and other components of the combine.

The invention should not be limited by the above-described embodiment, but should be limited solely to the claims that follow.

We claim:

1. An agricultural combine for harvesting a crop from a field, for threshing and separating the grain contained in that crop from straw and chaff, the combine comprising:
    a supporting structure having ground engaging means for supporting and propelling the supporting structure;
    a threshing means mounted on the supporting structure for threshing a harvested crop;
    an axial separating unit that extends longitudinally within the supporting structure for separating the grain contained in a harvested and threshed crop from straw;
    fan means for forming an air stream is located on the supporting structure;
    duct work for directed the air stream to the top of the axial separator unit; and
    apertures in the supporting structure for venting the top of the axial separator unit.

2. An agricultural combine as defined by claim 1 wherein the fan means comprises the cooling fan for an internal combustion engine used to drive the threshing means and the axial separator unit.

3. An agricultural combine as defined by claim 2 wherein a deflector is located above the axial separator unit for directing the air stream along the top of the axial separator unit.

4. An agricultural combine for harvesting a crop from a field, for threshing and separating the grain contained in that crop from straw and chaff, the combine comprising:
    a supporting structure having ground engaging means for supporting and propelling the supporting structure;
    a feederhouse extending axially outward from the supporting structure, the feederhouse directing a harvested crop into the supporting structure;
    a transverse threshing cylinder and concave for receiving a harvested crop from the feederhouse;
    separating means extends longitudinally within the supporting structure for separating the grain contained in a harvested and threshed crop from straw, the axial separating means comprises a pair of separating units mounted side-by-side, each separating unit comprises a cylindrical tube, a rotor housed in the tube, an inlet and an outlet, the tubes have a top on which dust and chaff may collect;
    an internal combustion engine for driving the threshing means and the axial separating means, the internal combustion engine having a cooling fan providing a cooling air stream; and
    duct work intercepting a portion of the cooling air stream and directing it on top of the axial separator unit.

5. An agricultural combine as defined by claim 4 wherein the supporting structure is provided with exhaust openings that vent the top of the axial separator unit.

6. An agricultural combine as defined by claim 5 wherein the duct work is provided with a guide vane providing a more even air flow through the duct work.

7. An agricultural combine as defined by claim 6 wherein a deflector is located above the axial separator unit for directing the cooling air stream across the top of the separator units.

8. An agricultural combine for harvesting a crop from a field, for threshing and separating the grain contained in that crop from straw and chaff, the combine comprising:
    a supporting structure having ground engaging means for supporting and propelling the supporting structure;
    a feederhouse extending axially outward from the supporting structure, the feederhouse directing a harvested crop into the supporting structure;
    a transverse threshing cylinder and concave for receiving a harvested crop from the feederhouse;
    an axial separating means extends longitudinally within the supporting structure for separating the grain contained in a harvested and threshed crop from straw, the axial separating means comprises a pair of separating units mounted side-by-side, each separating unit comprises a cylindrical tube, a rotor housed in the tube, an inlet and an outlet, the tubes have a top on which dust and chaff may collect;
    an internal combustion engine for driving the threshing means and the axial separating means, the internal combustion engine having a cooling fan providing a horizontal transverse cooling air stream; and
    duct work intercepting a portion of the transverse horizontal cooling air stream and directing vertically downward to the axial separator unit.

9. An agricultural combine as defined by claim 8 wherein a deflector is located above the axial separator and changes the direction of the vertically downward air stream to a substantially horizontal axial air stream.

10. An agricultural combine as defined by claim 9 wherein the substantially horizontal axial air stream has a forward component and a rearward component.

11. An agricultural combine as defined by claim 10 wherein the supporting structure is provided with exhaust apertures through which the forward component of the axial air stream is exhausted.

12. An agricultural combine as defined by claim 11 further comprising an exhaust gap through which the rearward component of the axial air stream is exhausted.

* * * * *

UNITED STATES PATENT AND TRADEMARK OFFICE
CERTIFICATE OF CORRECTION

PATENT NO. : 5,088,960

DATED : 18 February 1992

INVENTOR(S) : Mark F. Stickler and Michael D. Benhart

It is certified that error appears in the above-identified patent and that said Letters Patent is hereby corrected as shown below:

Column 3, line 50, delete "directed" and insert --directing--.

Column 4, line 6, fore "separating" insert --an axial--.

Signed and Sealed this

Tenth Day of August, 1993

Attest:

MICHAEL K. KIRK

*Attesting Officer*    Acting Commissioner of Patents and Trademarks